United States Patent [19]

Mistretta

[11] 4,280,546
[45] Jul. 28, 1981

[54] MULTI-ANNULAR CHAMBER, TUBELESS SAFETY TIRE

[76] Inventor: Victor S. Mistretta, 4703 Eleventh Ave., Brooklyn, N.Y. 11219

[21] Appl. No.: 123,212

[22] Filed: Feb. 21, 1980

Related U.S. Application Data

[63] Continuation of Ser. No. 928,444, Jul. 27, 1978, abandoned.

[51] Int. Cl.³ .............................................. B60C 11/14
[52] U.S. Cl. .............................. 152/330 RF; 152/342
[58] Field of Search ............... 152/339, 342, 344, 331, 152/330 RF, 340, 341, 327, 328, 329

[56] References Cited

U.S. PATENT DOCUMENTS

| 782,155 | 2/1905 | Maxon | 152/342 |
|---|---|---|---|
| 2,223,007 | 11/1940 | Legowsky et al. | 152/342 |
| 2,572,594 | 10/1951 | Bushemi | 152/342 |
| 3,127,920 | 4/1964 | Hercules | 152/339 |
| 3,942,572 | 3/1976 | Crandall | 152/339 |

FOREIGN PATENT DOCUMENTS 243890 12/1925 United Kingdom ............... 152/340

Primary Examiner—Michael W. Ball
Attorney, Agent, or Firm—Richard L. Miller

[57] ABSTRACT

An inflated wheel tire for a vehicle, and which is divided by several partitions into a plurality of circular chambers so that in case one of them becomes punctured and deflated, then the others will continue to remain inflated so to allow the vehicle to continue traveling without interuption of a "flat tire"; and the tire including air intake valves located on the partition walls and extending therethrough so that each valve supplies air to both chambers on each side of the partition.

2 Claims, 4 Drawing Figures

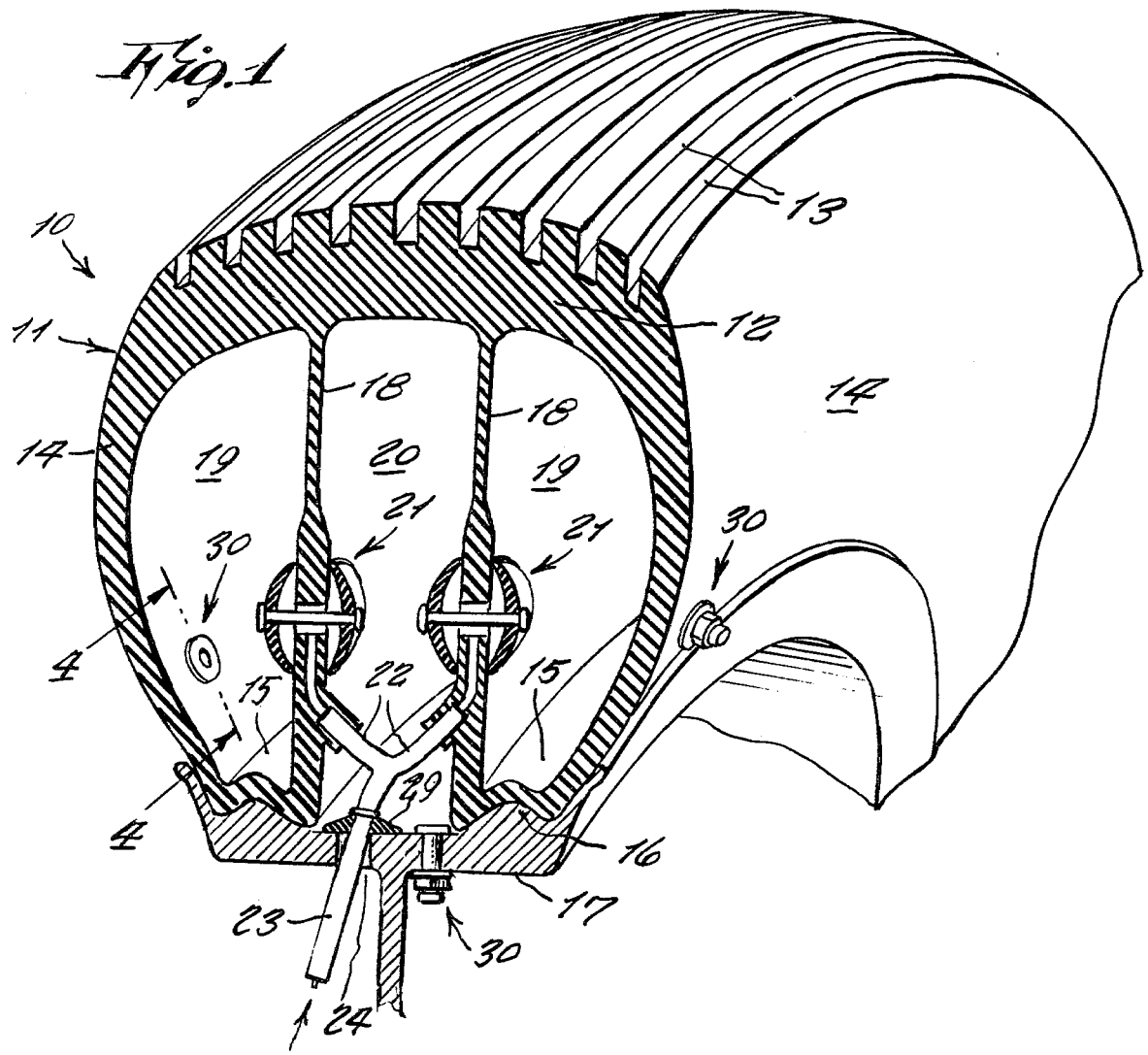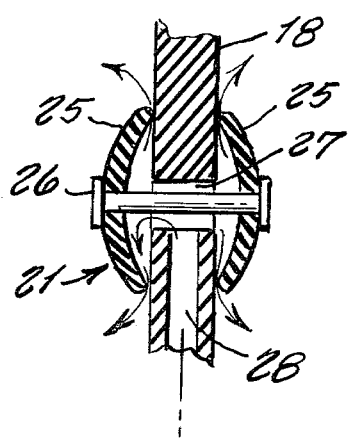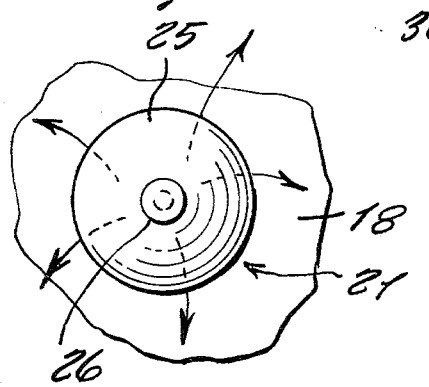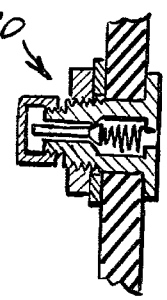

MULTI-ANNULAR CHAMBER, TUBELESS SAFETY TIRE

This is a continuation, of application Ser. No. 928,444, filed July 27, 1978, now abandoned.

This invention relates generally to pneumatic tires for being mounted on rims of vehicle wheels.

It is well known that one of the most common troubles that occur in automobile travel is getting a "flat tire" when an air-inflated tire becomes punctured by some object upon the road surface, and the vehicle immediately is unable to continue traveling further, but must be repaired on the spot. If such vehicle is being driven by a woman or older person alone, it can be difficult to physically accomplish this task without getting assistance from others. Or the vehicle driven by anyone may be obliged to meet a schedule on time so that there is no allowance made for a vehicle breakdown, which of course is always possible to occur by the use of conventional tires now being used. This situation is objectionable and is therefore in want of an improvement.

Accordingly it is a principal object of the present invention to provide a super-safety tire that eliminates the likely possibility of going completely flat in case it is punctured.

Another object is to provide a super-safety tire which can be particalarly ideal for use on all automotive vehicles such as passenger cars, trucks, buses and the like.

Yet another object is to provide a super-safety tire that prevents occurance of a car going out of control due to a tire blowout or puncture at high speed.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

FIG. 1 is a cross sectional view of a tire shown incorporating the present invention.

FIG. 2 is an enlarged detail of a double flap valve illustrated in FIG. 1.

FIG. 3 is a side view thereof.

FIG. 4 is an enlarged cross sectional view on line 4—4 of FIG. 1, and showing a typical air release valve used for each of the tire compartments in order to deflate the tire when wishing to remove the tire from a wheel rim.

Refering now to the drawing in greater detail, the referance numeral 10 represents a super-safety inflatable, tubeless tire according to the present invention wherein the same is made of rubber and includes a casing 11 which is generally U-shaped in cross-sectional configuration that includes an outer peripheial facing 12 grooved with surface treads 13, and opposite side walls 14 which, in the present invention, at their radially inner edge are each integral with a narrow inner wall 15 for sitting in a seat 16 formed upon an outer periphery of a wheel 17, so to replace the conventional tire bead.

In the present invention, also a plurality of rubber partitions 18, inside the tire, divide the tire interior into separate, circular air chambers that extend around the wheel. The outer edge of each partition is formed integral with the facing 12 which the inner edge thereof is integral with the inner wall 15. Thus the side chambers 19 are each sealed due to the inner wall 15, while a central chamber 20 is open at its radially inward end, but which becomes sealed by the wheel when the tire is mounted thereupon.

The air chambers 19 and 20 are air-inflated by means of valves 21 mounted on the partitions and which are connected to branch lines 22 of a tubing 23 that extends outwardly from chambers 20 through an opening 24 in the wheel so that its outer end is exposed for connection to an air pump for inflation of the tire.

Each valve is of flapper valve type and includes a resilient rubber, circular disc 25 on each side of the partition, the disc being dished on its side that faces the partition. A rivet 26 extends through a center of both discs and through a diametrically enlarged opening 27 through the partition. A passage 28 inside the partition communicates at one end with an intermediate portion of the opening 27, and at its other end communicates with a tube branch line 22.

A rubber gasket 29 around the tubing 23 seals the chamber 20 from air leaking out of the wheel opening 24.

It is now evident that in operative use, in case one or even more of the air chambers are punctured while a vehicle is traveling, then the tire is maintained from collapsing circularly by the remaining air chambers that are still sealed.

While the above-described tire may be constructed without means for releasing air from the air chambers, particularly when used on military vehicles of all type, it could be manufactured in a modified design for use by others, and which includes air release valves 30, so to permit deflating the chambers at such time when removing the tire from a wheel during a tire change or repair.

Thus there is provided a super-safety tire having the above-indicated advantages and which additionally eliminates traffic tie-ups on crowded highways due to a vehicle flat tire, and which additionally eliminates wearing out of a tire and wheel by continuing to travel thereupon when the tire has a "flat;" the present invention permitting a motorist to fix a punctured tire whenever he has time for getting to it, instead of urgently at once.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A super-safety inflatable, tubeless tire for automotive vehicles comprising in combination, a circular casing of resilient material, and being fitted around an outer periphery of a wheel, said casing being of generally U-shaped cross sectional configuration by including an outer peripheral facing and opposite side walls, grooved treads around an outer side of said facing, a closed air chamber adjacent an inner side of each said side walls respectively defined and enclosed by means of said side walls, a portion of said outer peripheral facing, a pair of spaced apart parallel radial partitions extending from said outer facing and axially directed inner walls inwardly extending from a radially inward edge of each said side wall to a respective one of said partitions, each said inner wall being around an outer periphery of said wheel, the space between said partitions being closed by said wheel outer periphery so as to form an intermediate air chamber, all three said air chambers extending circularly around said wheel; an inner intake valve mounted on each of said partitions, each said air intake valve communicating with both said air chambers on each side of said partition, both said air intake valves being connected to branch lines of a common tubing which extends outwardly of said tire interior for attachment at its outer end to an air pump whereby all of said chambers can be simultaneously filled through a common input.

2. The combination as set forth in claim 1, and further comprising an individual air release valve connected to each of said air chambers so as to communicate each air chamber with the atmosphere.

* * * * *